March 7, 1967 P. A. HOOGESTEGER 3,307,896
MICROSCOPE WITH UNITARY MOLDED STAND AND ATTACHED STAGE
Filed Dec. 26, 1962 2 Sheets-Sheet 1
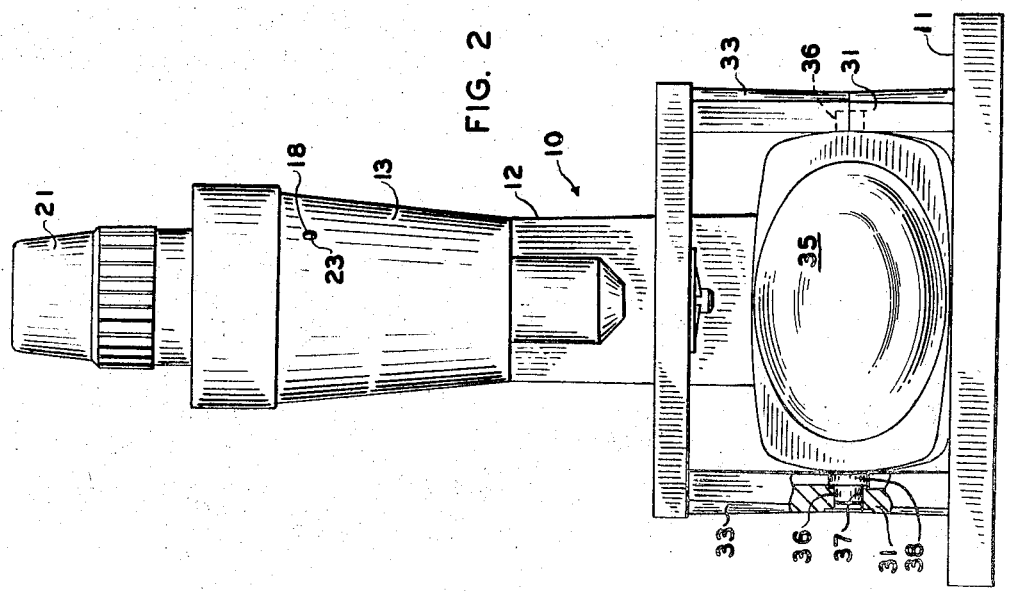
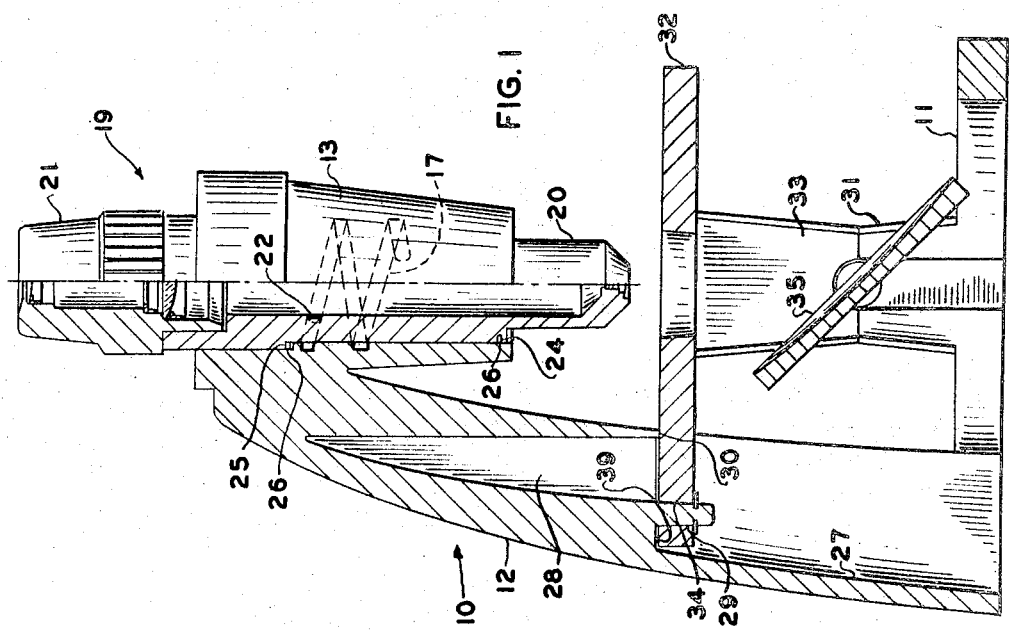
INVENTOR.
PAUL A. HOOGESTEGER
BY Frank C. Parker
ATTORNEY March 7, 1967  P. A. HOOGESTEGER  3,307,896
MICROSCOPE WITH UNITARY MOLDED STAND AND ATTACHED STAGE
Filed Dec. 26, 1962  2 Sheets-Sheet 2

INVENTOR.
PAUL A. HOOGESTEGER
BY *Frank C. Parker*
ATTORNEY 3,307,896
MICROSCOPE WITH UNITARY MOLDED STAND AND ATTACHED STAGE
Paul A. Hoogesteger, Brighton, N.Y., assignor to Bausch & Lomb Incorporated, Rochester, N.Y., a corporation of New York
Filed Dec. 26, 1962, Ser. No. 247,017
2 Claims. (Cl. 350—84)

The present invention relates to microscopes and more particularly to an improved microscope construction which lends itself easily to mass production techniques.

The principal object of the present invention is to provide a simple and cheap to manufacture microscope and yet still provide a microscope which is suitable for relatively low power applications.

More particularly, it is an object of the present invention to provide a microscope wherein a unitary stand is molded of a thermosetting plastic and comprises a unitary base, upright arm and overhanging sleeve, with the base being provided with upstanding molded struts for supporting the microscope viewing stage and the overhanging sleeve being provided with an internal thread for enabling focusing adjustment of a viewing tube mounted in the sleeve.

The principal advantage of the present invention stems from the simplicity of construction of the molded parts which enables the use of molding techniques for parts which normally require accurate construction.

The foregoing and other objects and advantages of the present invention will become more apparent from the following detailed description when read in conjunction with the appended drawing, wherein:

FIG. 1 is a side elevational view shown partly in section and illustrating the principal features of the invention;

FIG. 2 is a front elevational view of the invention;

Figure 4:
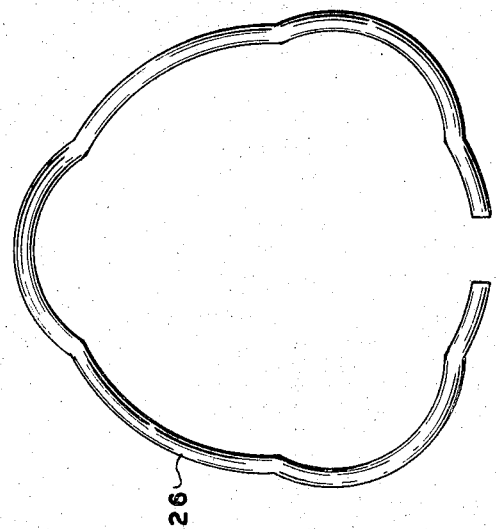
FIG. 4 is a detail view illustrating one of the locking springs for providing a smooth fit of the microscope viewing tube in its mounting sleeve.

With reference now to the drawing, wherein like reference numerals have been used in the different views to identify identical parts, the microscope preferably comprises a unitary stand designated generally by reference numeral 10. The stand 10 is preferably molded unitarily and provides a base 11, an upright arm 12 and an overhanging microscope tube mounting sleeve 13. Preferably the material of which the stand 10 is molded comprises a thermosetting plastic commonly known as melamine-formaldehyde-phenolic or phenolic, either of which is available commercially.

Figure 3:
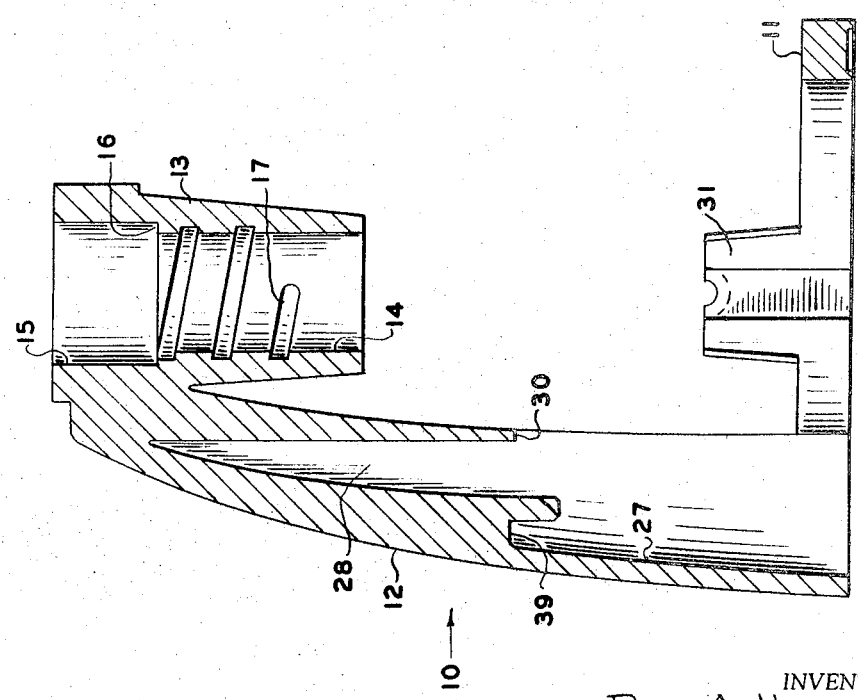
FIG. 3 is a side sectional view of the unitary molded stand comprising a base, an upright arm and an overhanging microscope viewing tube mounting sleeve.

Referring principally to FIGS. 1 and 3, it will be noted that the sleeve 13 is formed with two substantially concentric bore portions 14 and 15 separated by a radial shoulder 16. The bore portion 14 has a spiral thread or groove 17 molded therein and is also provided with a small threaded opening 18 therethrough which intersects the threaded groove 17 near the upper end thereof.

A microscope viewing tube 19 comprising an objective 20 and an eyepiece 21 and being of a suitable diameter to afford a sliding fit within sleeve 13 is received within sleeve 13. The viewing tube 19 is provided with an outwardly projecting pin 22 which is received within the groove 17. After insertion of the viewing tube 19 into the mounting sleeve 13 a screw 23 may be turned into the threaded opening 18 in order to provide an abutment for pin 22 which prevents withdrawal of the tube 19 from within the sleeve 13 by turning the pin 22 out of the groove 17.

In order to provide a smooth fit of the viewing tube 19 in the sleeve 13, the tube 19 is provided with a pair of peripheral grooves 24 and 25 within which spring rings 26, as shown in detail in FIG. 4, are disposed. The spring rings 26 are so designed as to resiliently bear on both the peripheries of the grooves 24 and 25 and on the inner surface of sleeve 13 so as to maintain the viewing tube 19 substantially snugly fitted within the sleeve 13. Thus in order to focus the microscope viewing tube 19 all that is needed is to turn the tube 19 within the sleeve 13, the pin 22 and groove 17 being thereby effective to longitudinally adjust the position of the tube 19 within the sleeve 13.

The upright arm 12 of the unitary stand is cut away on the inner lower portion, as indicated at 27 and is cored, as at 28, the latter being effective to cut down excessive weight. An integral pin-like projection 29 extends downwardly into the relieved region or portion 27 and a ledge surface 30 also faces downwardly. The lower surface of ledge 30 extends slightly below surface 39.

The base 11 is provided with a pair of upstanding struts 31 on opposite sides of the base 11, the struts 31 being molded as part of the base 11. The struts 31, pin 29 and ledge 30 together support a stage 32. The stage 32 is provided with a pair of downwardly extending or depending supporting struts 33 and a single aperture 34. The stage 32 may be securely positioned by inserting the pin 29 into aperture 34 and pushing upwardly on the stage to bring the depending struts on top of upstanding struts 31 and to bring the stage 32 into engagement with ledge 30. A locking nut of sheet metal, which operates by applying spring stress, may then be placed on the end of pin 29 to hold the stage 32 in place.

The microscope also includes a reflecting mirror 35 which is formed with a pair of opposed trunnions 36. The confronting portions of the struts 31 and 33 are molded so as to provide bearing halves which together form bearings 37 for trunnions 36. If desired, a friction washer 38 may be provided for facilitating retaining the mirror 35 in fixed position.

It is contemplated that changes and modifications may be made in the present invention without departing from the spirit or scope thereof.

What is claimed is:

1. In a microscope having a viewing tube containing the optical elements of the microscope, the improvement comprising a unitary stand molded of a thermosetting plastic and comprising a unitary base, upright arm and overhanging sleeve for receiving said viewing tube with the microscope optical elements contained therein, said upright arm including means defining an integral molded downwardly extending projection disposed at a level beneath the lower extremity of said overhanging sleeve and an abutment portion spaced from said projection and disposed at a level slightly below the upper end of said projection, said base including a pair of integral molded upstanding struts, a stage having an opening therein receiving said projection therethrough, and a fastener for retaining said projection within said opening, said stage being disposed in engagement with said abutment portion and respectively supported on opposite sides by said upstanding struts to thereby position said stage beneath said viewing tube.

2. In a microscope having a viewing tube containing the optical elements of the microscope, the improvement comprising a unitary stand molded of a thermosetting plastic and comprising a unitary base, upright arm and overhanging sleeve for receiving said viewing tube with the microscope optical elements contained therein, means defining a molded threaded groove on the inner surface of said sleeve for cooperation with a projection on said viewing tube for enabling focusing adjustment of the latter within said sleeve, said upright arm including means defining an integral molded downwardly extending pin-like projection disposed at a level beneath the lower extremity of said overhanging sleeve and an abutment portion spaced from said pin-like projection and disposed at a level slightly below the upper end of said pin-like projection, said base including a pair of integral molded upstanding struts, and a stage having an opening therein receiving said projection therethrough, a fastener for retaining said projection in said opening, said stage being disposed in engagement with said abutment portion and respectively supported on opposite sides by said upstanding struts to thereby position said stage beneath said viewing tube.

References Cited by the Examiner

UNITED STATES PATENTS

| | | | |
|---|---|---|---|
| D. 198,403 | 6/1964 | Hoogesteger | D57—1 |
| 1,987,776 | 1/1935 | Hauser | 88—39 |
| 2,635,504 | 4/1953 | Hawkins | 88—39 |
| 2,649,837 | 8/1953 | Wiese | 88—1 |

FOREIGN PATENTS

| | | |
|---|---|---|
| 163,379 | 6/1949 | Austria. |
| 205,255 | 9/1959 | Austria. |

DAVID H. RUBIN, *Primary Examiner.*

J. G. BOLTEN, *Assistant Examiner.*